Figure 1:
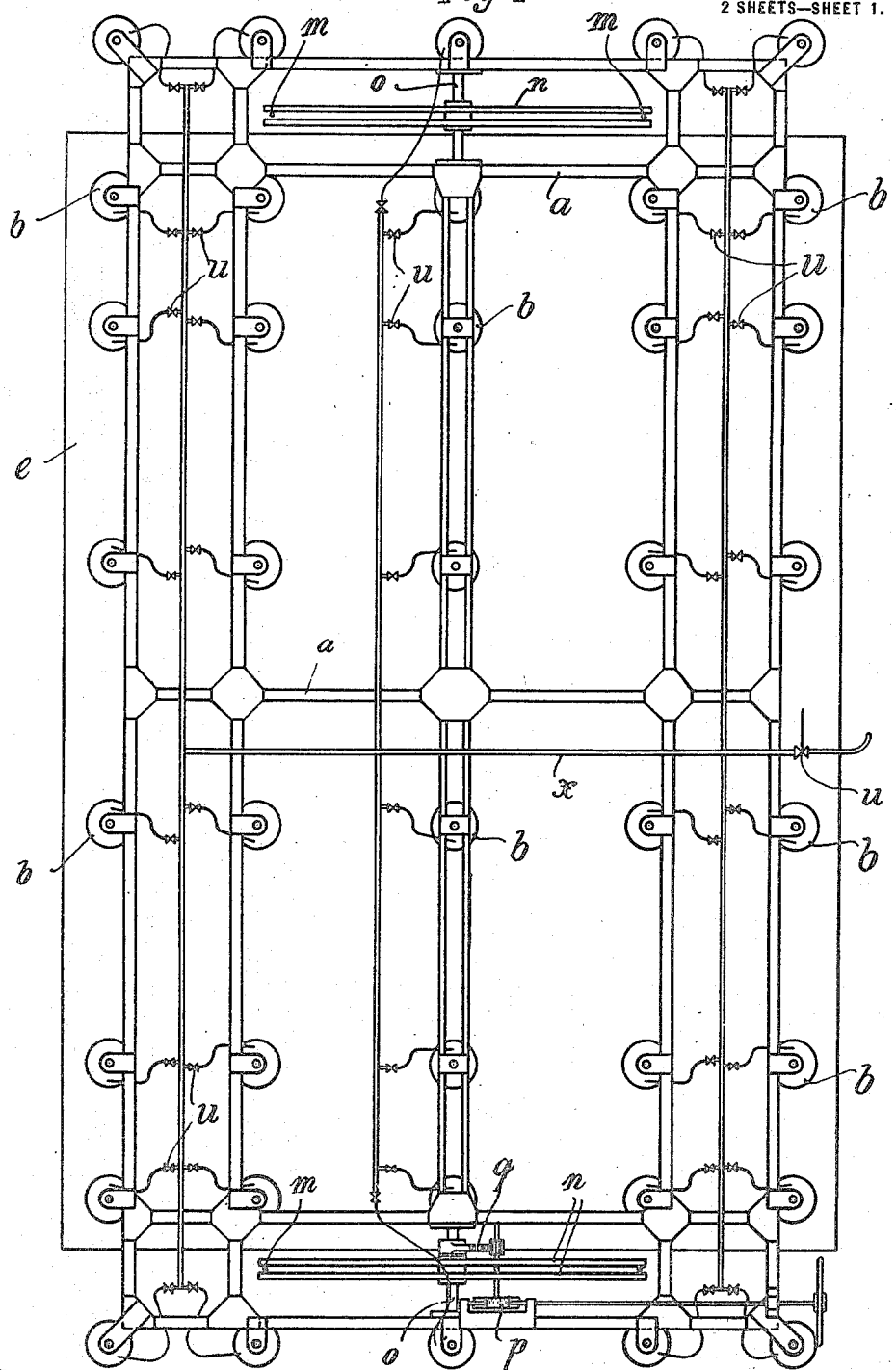

G. MONNET.
DEVICE FOR LIFTING, LOWERING, AND CONVEYING FRAGILE OBJECTS, SUCH AS SHEET GLASS AND THE LIKE.
APPLICATION FILED AUG. 22, 1912.

1,228,690.

Patented June 5, 1917.
2 SHEETS—SHEET 1.

Witnesses
John C. Sanders
Albert F. Houman

Inventor
Georges Monnet
BY
ATT'Y

G. MONNET.
DEVICE FOR LIFTING, LOWERING, AND CONVEYING FRAGILE OBJECTS, SUCH AS SHEET GLASS AND THE LIKE.
APPLICATION FILED AUG. 22, 1912.
1,228,690.
Patented June 5, 1917.
2 SHEETS—SHEET 2.
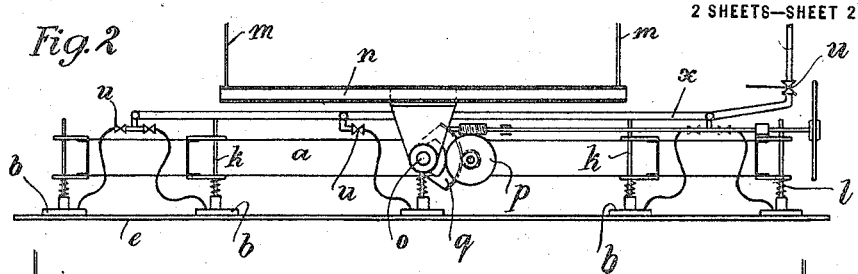
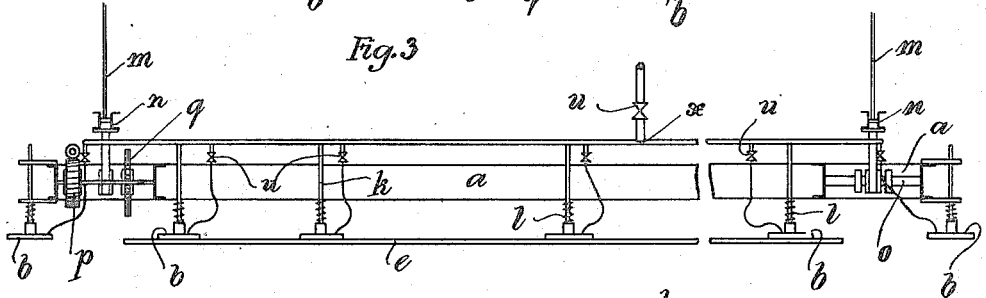
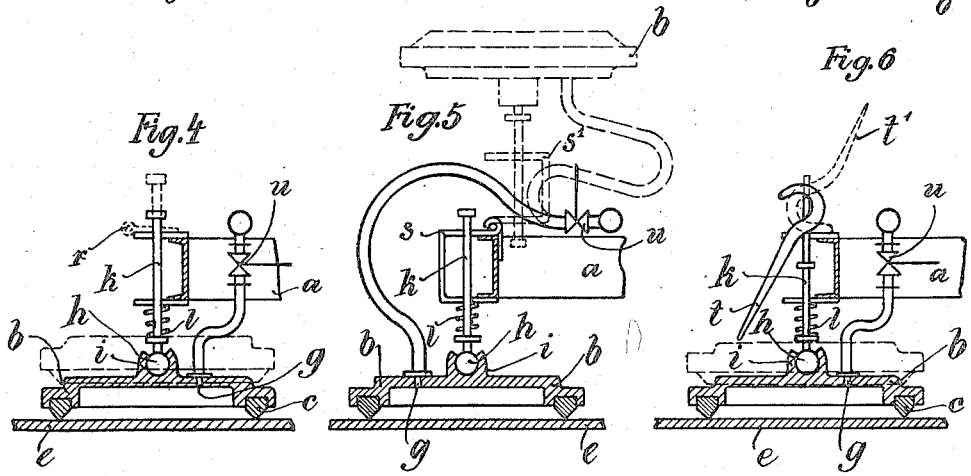
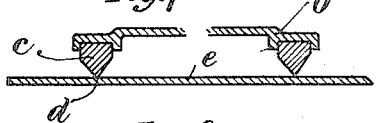
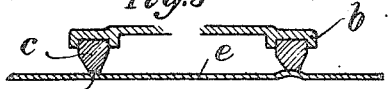
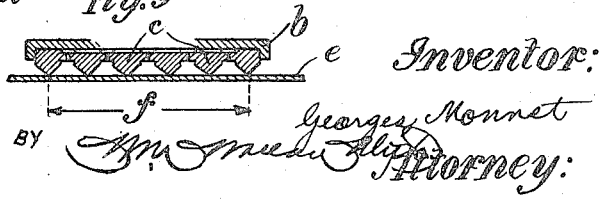
Witnesses:
John C. Sanders
Albert F. Heuman
Inventor:
Georges Monnet
BY
Attorney

UNITED STATES PATENT OFFICE.

GEORGES MONNET, OF STOLBERG, GERMANY.

DEVICE FOR LIFTING, LOWERING, AND CONVEYING FRAGILE OBJECTS, SUCH AS SHEET-GLASS AND THE LIKE.

1,228,690. Specification of Letters Patent. Patented June 5, 1917.

Application filed August 22, 1912. Serial No. 716,436.

*To all whom it may concern:*

Be it known that I, GEORGES MONNET, a citizen of the Republic of France, residing at Eisenbahnstrasse 149, Stolberg, Rheinland, Germany, have invented new and useful Improvements in Devices for Lifting, Lowering, and Conveying Fragile Objects, such as Sheet-Glass and the like, of which the following is a specification.

It has already been proposed to lift, lower and transport fragile objects, such as sheet glass and the like by means of devices in which a considerable number of suction disks, arranged on a common conveyer frame, seize the object to be conveyed. Such transporting devices, however, in reality, suffer from the very serious disadvantage that they do not at all or not with sufficient reliability accommodate themselves to the uneven surfaces or the various forms or positions of the articles to be carried. Thus, such devices are not adaptable at all to many an object, while in other cases they fail by reason of the suction disks becoming leaky during transit, so that the objects suspended from a crane are liable to break loose and eventually to drop off.

The present invention aims at the prevention of such evils. This is mainly attained by the particular shape given to the rubber-fitting provided on the suction disks, but also by the feature that the suction disks individually as well as the conveyer frame carrying the latter, as a whole, are yieldingly, that is to say adjustably arranged in such a manner that the lifting device, mainly intended for transporting plate glass sheets, may fit any uneven surface, form or position of the object to be moved, for instance a sheet of raw glass.

For this purpose the rubber-fitting attached to and provided for securing close contact of every suction disk, is of a sharp edged, for example, triangular cross-section. The sharp edge of such rubber-fitting bears against the object to be lifted and under the pressure of suction conforms itself to the smallest unevenness in the surface of the said object. Moreover each individual suction disk is suspended by means of a universal joint from the common conveyer frame, by which means it is enabled to adjust itself to somewhat more pronounced uneven or inclined surfaces. In addition to this, the suction disks are arranged in such a way that they may individually be turned up or withdrawn so as to be thrown out of action altogether, when this should be necessary on account of more prominent projections in the surface of the object to be conveyed. Finally the frame, carrying these suction disks, is itself rotatably mounted on an auxiliary frame which is suspended from the crane, in such a way, that in being set on obliquely shaped or inclining objects all the suction disks may be brought to bear simultaneously.

By these means the new device may be so adjusted as to fit accurately the most varied shapes or positions of the object. They also greatly facilitate their handling, more particularly in the case of sheets of plate glass of large dimensions, when placing them on the polishing table and removing and stacking them after treatment, operations, which by hand are fraught with considerable inconvenience and even danger.

In the drawings:—

Figure 1 shows a plan;

Fig. 2 a side elevation; and

Fig. 3 a front elevation of the new transporting device; while in

Figs. 4 to 9, several constructional forms and details of a suction disk are shown on enlarged scale.

The lifting and transporting device consists firstly in a frame $a$ and a suitable number of suction disks $b$, which are arranged on its under-side. The latter, with a view of securing close contact are provided with rubber fittings of a specially designed shape.

According to the present invention the said rubber fittings are of a sharp edged, for instance, triangular section. As is particularly and distinctly shown in Figs. 4 to 7, the suction disk $b$ bears with the sharp edge $d$ of the rubber fitting $c$ on the object to be lifted, for example on a sheet of raw glass $e$. When suction is applied, the high pressure on the restricted contact surface, will cause the said rubber fitting $c$ to conform itself closely and tightly to all and every uneven part in the surface of the glass sheet (Fig. 8), so that perfectly tight contact is insured, without any necessity whatever to moisten the edges of the suction disk or to paint them with some adhesive matter. If the diameter of the suction disk is large, several concentrically arranged rubber-rings c may be used instead of a single rubber ring only, as is shown, as an example, in Fig. 9. In this way the external air pressure on the space f is evenly distributed over all of the rings, and consequently bursting of the glass through the exterior air pressure is effectively prevented. The sharp edges d, d of the individual rubber rings, can conform themselves, independently of each other, to the surface of the object to be lifted. The suction pipe g has communication with the spaces formed between each of the concentric rings c of Fig. 9, through suitable perforations or passages formed in the plate c', as clearly shown in Fig. 9.

Besides, the opening g of the suction pipe, provided for each suction disk b, is of so small a dimension that even under sudden starting of the vacuum apparatus, vacuum in the individual suction disks is created slowly and gradually only. A considerable number of suction disks may also remain open, without producing prejudicial re-action on the other suction disks. Moreover, and although some of the suction disks may not immediately be operative the other disks, which nevertheless are effective, will, in attracting the sheet of plate glass toward the conveyer frame cause it to make contact with the hitherto inoperative suction disks. But even if this should fail, the air, drawn through the narrow opening into the suction pipe, causes a whistling sound, so that such failure will be detected immediately and may if necessary be remedied by pressing the particular suction disk manually against the glass sheet. In addition to this, the narrow suction openings have the effect that, though cracks may occur in one or more of the suction places of the lifted sheet, yet vacuum in the other suction disks is not perceptibly reduced. Finally, back pressure valves such as it has hitherto been customary to provide in the air pipes, may be dispensed with altogether. Such back pressure valves, as is well known, are exceedingly susceptible to improper operation and accurate adjustment of any considerable number of them is extremely difficult. It is therefore quite within possibility that, when vacuum is created suddenly, the back pressure valves might close just at the very moment when the glass sheet should be attracted. Faulty closing of individual back pressure valves may cause failure of the corresponding suction disks. And if, finally, a valve should fail to act in case of one leaking suction device, the sheet will drop off from the lifting device. All such evil eventualities cannot possibly happen with the new device, which moreover has the advantage of greater simplicity.

In order to enable adjustment to more pronounced unevenness or partly oblique surfaces of the object to be lifted, the present invention provides that each individual suction disk b is suspended from the conveyer frame a by means of a universal joint h (Figs. 4 to 6). In the drawings this joint, by way of example, is represented as a ball and socket joint. Obviously, however, any other universal joint might be employed.

In order to further increase the adjustability of the suction disks individually, the said joints h, carrying the suction disks b, according to the present new arrangement, are resiliently connected to the conveyer frame each one by means of a bolt k so as to allow reciprocating up and down movement. The spiral springs l, which are mounted between the conveyer frame a and the joints h, simultaneously serve as a shock absorber when the conveyer device is placed upon the object to be conveyed.

With a view, furthermore, to insure that all the individual suction disks may be brought to bear simultaneously on obliquely shaped or on reclining or upright objects, the common conveyer frame a, carrying the suction disks b, is rotatably suspended. As may be seen in Figs. 1 to 3, the conveyer frame a bears with its central axis o, on a separate auxiliary frame n which is suspended from the crane, for instance by the load ropes m. The conveyer frame a may thus be placed into any desired inclined position in relation to the auxiliary frame n, by means of a worm and worm gear p and spur-wheel segment q actuated thereby. This is particularly useful for lifting a sheet of plate glass from an inclined table or for seizing a reclining or upright sheet of plate glass.

The principal advantage of a conveyer frame, capable of being tilted, however, will be found in releasing plate glass sheets from the plaster on the polishing table. To do this it is inevitable to loosen them first at one end and then to release the sheet gradually until completely freed. Such glass sheets, which are embedded on the table in plaster of Paris are indeed held so strongly that a very considerable force would be required to remove them by a single direct pull.

After the suction disks have adhered firmly the auxiliary frame is tilted toward the main frame by means of the worm and worm-gear and subsequently the crab of the hoisting-jack of the crane is operated. The auxiliary frame suspended upon the 4 load-ropes remains in the horizontal plane, but the frame, together with the suction disks, will rise in consequence of the slanting position given it.

One end of the main frame will rise at first and the suction disks fastened thereupon will lift the plate from this end. The same operation takes place in connection with the remaining series of suction disks when the main frame is lifted higher, and the plate embedded onto the surface is readily lifted off therefrom.

The plate, when lifted off completely, as well as the frame carrying the same are tilted in respect to the horizontal position, but the same may be placed again in a horizontal position by means of the worm and worm-gear and through the reverse movement of the frame.

When starting the lift it is important that the glass sheet should not project too far beyond the outermost row of suction disks as otherwise it is liable to break. The suction ports may be spaced farther apart at the center of the glass sheet than at the edge thereof. Consequently, the suction disks $b$ according to this new invention, are within a rectangle, which corresponds to the smallest size of glass sheets to be conveyed, arranged in parallel rows fairly wide apart from each other, while beyond the limits of the said rectangle, the parallel rows of suction disks are arranged in closed proximity, so that the different sizes of glass sheets may always be engaged near their edges. In this manner the suction disks may be restricted to the smallest possible number. The general disposition of the suction disks is clearly shown in Fig. 1.

Finally, and in order to enable adjustment of the new conveyer device also to such objects, whose surface shows prominent projections, the suction disks are so arranged that they may individually be withdrawn or turned aside or back on hinges.

According to the construction shown in Fig. 4 the rod $k$ carrying the ball and socket joint $h$ and guided on the frame $a$ in such a way as to allow it vertically reciprocating movement, may be held in its upper position by means of a retaining pin $r$. In the construction shown in Fig. 5, the suspension rod $k$ bears in a yoke $s$ which is hinged to the conveyer frame $a$, and may be turned up into the position of $s'$ shown in dotted lines when it is desired to throw the particular suction disk out of action. Another form of construction is shown in Fig. 6. Here, reversing of the eccentric lever $t$, bearing against the conveyer frame $a$, into the position $t'$ shown in dotted lines, lifts the suction disk and throws it out of action. The lever $t$ is secured rotatably around an axis affixed to the suspension rod $k$. If this lever $t$ is lifted at its longer end, then the shorter rounded off arm of the lever engages the transporting frame and the fulcrum of the lever and the rod $k$ likewise are elevated. The lift of the lever terminates when the lever has made one half of its revolution. The lever remains stationary in this upright position, so that the rod $k$ cannot drop.

The capability of throwing any individual suction disk out of action, is also in so far to be considered as a feature of the present invention, inasmuch as it is important to prevent non-operative suction disks, which might reach beyond smaller sized glass sheets, from adhering to the plaster of Paris bedding on the polishing table.

The several suction disks may be connected to the vacuum generator by a common pipe $x$, as for example is shown in Fig. 1 of the drawings, or else the suction disks may individually or in groups be connected by separate connections to the generator. Each separate suction disk or group of disks is preferably provided with a shut-off cock $u$, a valve or other equivalent device, as shown in Figs. 1 to 6. By this means it is possible to render operative, the exact number of suction disks which may be required having regard to the size, the form and the weight of the object to be conveyed and thus to provide the required lifting capacity.

Having now particularly described and ascertained the nature of my said invention and in what manner the same is to be performed I declare that what I claim is:—

1. In a device for lifting sheets of fragile material, in combination, a frame having a plurality of hinged brackets provided with guide openings, rods mounted for rectilinear movement within the guide openings of the said brackets, suction cups mounted pivotally upon the respective rods, and means for exhausting the air from the said cups.

2. In a device for lifting sheets of fragile material, in combination, a main frame, suction cups carried by the said main frame, an auxiliary frame pivotally connected with the main frame and adapted to support the same, and means for adjusting the two frames angularly and for securing the same in adjusted position.

3. In a device for lifting sheets of fragile material, in combination, a frame, suction disks carried thereby, said disks being provided with a rubber member formed of a plurality of concentrically arranged rings the edges of which are in the same plane and are adapted to engage the surface of the sheet to be lifted, and means for exhausting the air from the spaces formed between said concentrically arranged rings.

In testimony whereof I have signed my name to this specification in the presence of two subscribing witnesses.

GEORGES MONNET.

Witnesses:
 HENRY QUADFLEIG,
 PAUL CHAUVEL.